US006219780B1

(12) United States Patent
Lipasti

(10) Patent No.: US 6,219,780 B1
(45) Date of Patent: Apr. 17, 2001

(54) CIRCUIT ARRANGEMENT AND METHOD OF DISPATCHING INSTRUCTIONS TO MULTIPLE EXECUTION UNITS

(75) Inventor: Mikko Herman Lipasti, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/179,603

(22) Filed: Oct. 27, 1998

(51) Int. Cl.[7] ................................. G06F 9/28; G06F 9/22
(52) U.S. Cl. ..................... 712/215; 712/206; 712/245
(58) Field of Search ......................... 712/203, 206, 712/217, 21, 20, 215, 226, 229, 214, 216, 200, 211, 23, 245, 43, 239, 207; 700/12, 22, 4; 710/18; 713/340, 501; 714/47

(56) References Cited

U.S. PATENT DOCUMENTS 5,475,856 * 12/1995 Kogge ..................................... 712/20
5,699,537 * 12/1997 Sharangpani et al. ............... 712/217

OTHER PUBLICATIONS

Chaitin, G. J., "Register Allocation & Spilling Via Graph Coloring", *Proceedings of the SIGPLAN '82 Symposium on Compiler Construction*, SIGPLAN Notices, vol. 17, No. 6, Boston, MA, (Jun. 1982), pp. 98–105.

Palacharla, Subbarao et al., "Complexity–Effective Superscalar Processors", IEEE ISCA–97 (no date), pp. 1–13.
Gwennap, Linley, "Digital 21264 Sets New Standard", *Microprocessor Report*, MicroDesign Resources, (Oct. 28, 1996).
Briggs, Preston et al., "Rematerialization", *Proceedings of the ACM SIGPLAN '92 Conference on Programming Language Design and Implementation*, SIGPLAN Notices, vol. 27, No. 7, San Francisco, CA, (Jul. 1992), pp. 311–321.
Chaitin, Gregory J. et al., "Register Allocation Via Coloring", *Computer Languages*, vol. 6, Great Britain (1981) pp. 47–57.

* cited by examiner

*Primary Examiner*—Daniel H. Pan
(74) *Attorney, Agent, or Firm*—Scott A. Stinebruner

(57) ABSTRACT

A data processing system, circuit arrangement, integrated circuit device, program product, and method dispatch multiple copies of a producer instruction to multiple execution units in a processor whenever it is determined that the producer instruction has or is likely to have multiple consumer instructions that are dependent on the producer instruction. Thus, when the multiple consumer instructions are subsequently dispatched to the multiple execution units, the results of the producer instruction are available within those execution units, and without the necessity for any inter-execution unit or inter-microcluster result forwarding. The decision of whether to dispatch multiple copies of a producer instruction may be made at runtime, e.g., within the dispatch unit of a processor, or in the alternative, may be made during compilation of a computer program to be executed on a multi-execution unit processor.

33 Claims, 4 Drawing Sheets

CIRCUIT ARRANGEMENT AND METHOD OF DISPATCHING INSTRUCTIONS TO MULTIPLE EXECUTION UNITS

FIELD OF THE INVENTION

The invention is generally related to computers and data processing, and in particular to the dispatch and execution of instructions in a processor circuit arrangements and the like.

BACKGROUND OF THE INVENTION

Computer technology continues to advance at a remarkable pace, with numerous improvements being made to the performance of both the design and architecture of processors—the "brains" of a computer—as well as the integrated circuit, or "chip", fabrication techniques used to manufacture such processors.

At the most basic level, a processor includes thousands or millions of transistors coupled together by conductive "wires". The transistors operate as logical switches that are arranged together in a particular manner to perform specific functions. To enable a processor to perform a particular task, the processor must be supplied with a sequence of instructions that form a computer program, which the processor then executes to perform the desired task. To execute an instruction, the processor typically "fetches" the instruction from an external memory, decodes the instruction to determine what function is to be performed by the instruction, and then performs that function to manipulate data stored in the computer. The actual performance of an function is typically performed by an execution unit in the processor, which oftentimes is also referred to as a "pipeline" since instructions typically proceed through a sequence of stages as they are processed.

Processor performance can be affected by design and architecture improvements principally by increasing the number of instructions that are processed each "cycle" of the processor—that is, the smallest time frame between successive processor operations. For example, one manner of increasing the number of instructions processed each cycle involves dispatching instructions to multiple execution units that operate concurrently with one another, so that a group of execution units are capable of processing multiple instructions in parallel.

Processor performance can also be affected by integrated circuit fabrication techniques, e.g., by decreasing the minimum size of the transistors used in a given processor. Decreasing the size of the transistors permits a larger number of transistors to be used in a given processor design, which increases the number of operations that a processor can perform during any given cycle. For example, additional transistors can be used to implement additional execution units so that greater parallelism may be achieved in a processor.

Decreasing the size of the transistors can also shorten the lengths of the conductive wires connecting the transistors together. Conductive wires have an inherent delay that limits the speed of a processor, in effect setting a minimum duration for each processor cycle. Should the delay in a particular conductive wire exceed the duration of a processor cycle, it is possible that a value transmitted from one end of the wire would not reach the other end of the wire during the same cycle, possibly resulting in an error that could cause unpredictable results or "crash" the processor. The delay of a wire is proportional to its length, and thus, if all conductive wire can be shortened, often a shorter duration processor cycle can be used, thereby increasing overall processor performance.

While both transistor size and wire delays are both decreasing as fabrication technologies improve, wire delays are not scaling down proportionately with transistor size. In particular, as a larger number of execution units are used in a design due to reduced transistor sizes, it becomes necessary to communicate information between different execution units using conductive wires coupled between the execution units, a process known as result forwarding. Moreover, the relative lengths, and thus the inherent delays, of these conductive wires typically increase due to the need to route the wires around a larger number of execution units.

For example, some instructions, referred to as "consumer" instructions, must be provided with the results of one or more earlier instructions, referred to as "producer" instructions, before the consumer instructions can be processed. For this reason, consumer instructions are said to be "dependent" upon producer instructions.

If a consumer instruction and a producer instruction are being processed by separate execution units, the relative delay associated with forwarding the result of the producer instruction from the producer instruction's execution unit to that of the consumer instruction can become a performance limiting factor. For this reason, a number of processing designs attempt to minimize the delays associated with result forwarding by grouping related execution units together into "microclusters" to attempt to minimize the delays associated with result forwarding. A microcluster is typically designed to ensure that the delays associated with the conductive wires that forward results between execution units within the microcluster will not exceed the duration of the processor cycle. Thus, it is ensured that all result forwarding occurring within a particular microcluster will meet the processor cycle requirements.

By grouping related execution units together into microclusters, it is often possible to ensure that a significant portion of the result forwarding occurring within a processor will occur solely within the microclusters. However, with any design, at least a portion of the results may need to be forwarded between execution units in different microclusters—often using conductive wires having inherent delays that exceed the duration of the processor cycle.

One conventional attempt to address this problem is to add one or more latches along the conductive wires between microclusters to in effect break each conductive wire up into a sequence of shorter wires having individual delays that meet the processor cycle requirements. However, adding such latches introduces a one or more processor cycle penalty, which can delay the processing of dependent consumer instructions and thus erode the gains achieved by using a larger number of execution units and subsequently decrease the performance of the processor.

Another conventional attempt to address this problem is to dispatch dependent instructions to the same execution unit or microcluster to attempt to minimize result forwarding. Different techniques, such as heuristics, may be used to determine where particular instructions should be dispatched. However, often such techniques are limited in scope, e.g., only a few instructions immediately following a particular instruction being analyzed, so the predictions made may not be particularly reliable.

Also, it has been found that many producer instructions have more than one consumer. If all consumers for a given producer instruction were dispatched to the same execution unit or microcluster, however, often the efficiency of the processor would be adversely impacted since often one execution unit or microcluster would be busy while other execution units or microclusters would be idle. The performance of a multi-execution unit processor, however, is maximized whenever all available execution units are busy processing instructions. Thus, simply dispatching all dependent instructions for a given producer instruction to the same execution unit or microcluster would often result in sub-par processor performance.

The alternative to dispatching multiple consumer instructions to the same execution unit or microcluster is to distribute the instructions to different execution units or microclusters to better balance the workload of the processor. However, doing so only increases the frequency of inter-execution unit and inter-microcluster result forwarding, again decreasing processor performance due to the additional cycles needed to forward results between execution units and microclusters.

Therefore a significant need exists in the art for a manner of maximizing the performance of a multi-execution unit processor by reducing the delays associated with result forwarding for dependent instructions, while balancing the workloads of the various execution units in the processor.

SUMMARY OF THE INVENTION

The invention addresses these and other problems associated with the prior art by providing a data processing system, circuit arrangement, integrated circuit device, program product, and method that determine, for a given producer instruction, whether to dispatch multiple copies of the producer instruction to multiple execution units in a processor. By making such a determination, multiple copies of that producer instruction may then be dispatched to multiple execution units to improve the performance of the processor.

Typically, a determination of whether to dispatch multiple copies of a producer instruction is based upon whether the producer instruction has or is likely to have multiple consumer instructions that are dependent on the producer instruction. Thus, when the multiple consumer instructions are subsequently dispatched to the multiple execution units, the results of the producer instruction are available within those execution units, often without the necessity for inter-execution unit or inter-microcluster result forwarding.

Implementations consistent with the invention exploit the fact that in many instances, the performance cost of communicating results may exceed the cost of simply recomputing those results wherever needed. Consequently, by dispatching multiple copies of a producer instruction to multiple execution units in appropriate circumstances, processor performance can be improved due to the reduced necessity for communicating results between execution units and/or microclusters. Moreover, given that multiple execution units can process the different consumer instructions in parallel, the relative workloads of the different execution units in a processor can be better balanced to maximize the performance of the processor.

In some embodiments, the decision of whether to dispatch multiple copies of a producer instruction is made at runtime, e.g., within the dispatch unit of a processor. In addition, in other embodiments the decision may be made during compilation of a computer program to be executed on a multi-execution unit processor, whereby typically no decision logic would need to be implemented within the processor itself.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
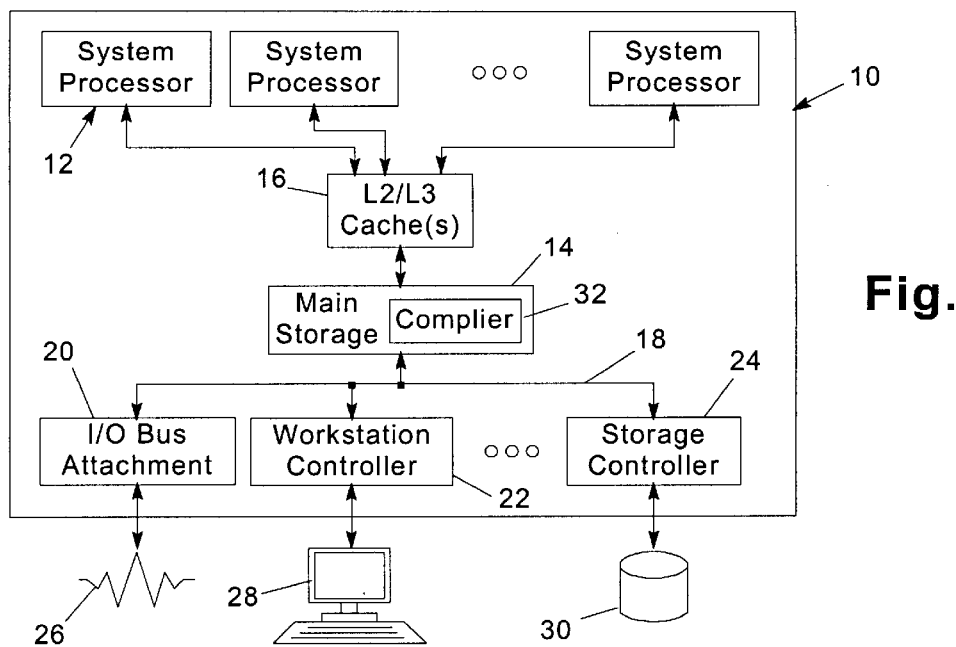
FIG. 1 is a block diagram of a data processing system consistent with the invention.

The illustrated implementations of the invention generally operate by dispatching multiple copies of a producer instruction to multiple execution units in a computer, typically in the same processor, such that multiple consumer instructions for the producer instruction that are processed by the multiple execution units can often obtain the results of the producer instruction without the need for communicating the results between the execution units. The decision of whether to dispatch multiple copies of an instruction may be made during runtime, e.g., within a dispatch unit in a processor. Alternatively, the decision may be made at compile time by a suitably configured compiler.

The determination of whether to dispatch multiple copies of an instruction may be made responsive to determining that a likelihood exists that multiple consumer instructions exist for that instruction. Determination of such a likelihood may be the result of a positive verification that multiple consumer instruction do in fact exist for the particular producer instruction. In the alternative, however, determination of such a likelihood may not be the result of any positive verification. Instead, the determination may simply be a prediction or "guess", which may be based upon any number of factors, e.g., current processor conditions, historical data and/or statistical analysis, among others.

Furthermore, in many implementations it is desirable, in addition to determining whether to dispatch multiple copies of a producer instruction, to determine where, or to which specific execution units, the multiple copies should be dispatched. Typically, such a determination is made based upon where it is known or anticipated that the consumer instructions for the producer instruction will ultimately dispatched, since it is desirable for the results of the execution of the producer instruction to be made available in the execution units within which the producer instruction's consumers are dispatched. By doing so, the results of execution of the producer instruction are provided as input parameters to the consumer instructions without any communication penalty since no inter-execution unit or inter-microcluster result forwarding is required.

An execution unit may be considered to include any execution pipeline or combination of pipelines that processes one or more types of instructions in the instruction set defined for the processor. Furthermore, an execution unit may be grouped with other execution units into microclusters within which result forwarding therebetween does not incur a performance penalty.

The multiple execution units in a processor typically operate concurrently with one another to process multiple instructions in parallel. It will be appreciated that two instructions may be considered to be processed in parallel as long as the execution of the two instructions at least partially overlaps in time, and even though execution of one instruction may start and/or complete at a different point in time than the other instruction.

Turning to the Drawings, wherein like numbers denote like parts throughout the several views, FIG. 1 illustrates the general configuration of an exemplary data processing system 10 suitable for dispatching an instruction to multiple execution units consistent with the invention. System 10 generically represents, for example, any of a number of multi-user computer systems such as a network server, a midrange computer, a mainframe computer, etc. However, it should be appreciated that the invention may be implemented in other data processing systems, e.g., in stand-alone or single-user computer systems such as workstations, desktop computers, portable computers, and the like, or in other computing devices such as embedded controllers and the like. One suitable implementation of data processing system 10 is in a midrange computer such as the AS/400 computer available from International Business Machines Corporation.

Data processing system 10 generally includes one or more system processors 12 coupled to a memory subsystem including main storage 14, e.g., a non-volatile memory storage such as an array of dynamic random access memory (DRAM). Also illustrated as interposed between processors 12 and main storage 14 is a cache system 16, typically including one or more levels of data, instruction and/or combination caches, with certain caches either serving individual processors or multiple processors as is well known in the art. Furthermore, main storage 14 is coupled to a number of types of external devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

It should be appreciated that data processing system 10 is merely representative of one suitable environment for use with the invention, and that the invention may be utilized in a multitude of other environments in the alternative. The invention should therefore not be limited to the particular implementations discussed herein.

Instruction dispatching consistent with the invention is typically implemented in a circuit arrangement on a system processor or other programmable integrated circuit device, and it should be appreciated that a wide variety of programmable devices may utilize instruction dispatching consistent with the invention. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

As will be discussed in greater detail below, instruction dispatching consistent with the invention may also be implemented in a software implementation, e.g., within a compiler 32 illustrated as resident in main storage 14. All or part of the program code implementing compiler 32 may be resident from time to time in other components in data processing system 10, e.g., within any of the caches in cache system 16, within DASD 30, and/or within any of system processors 12, among others.

Figure 2:
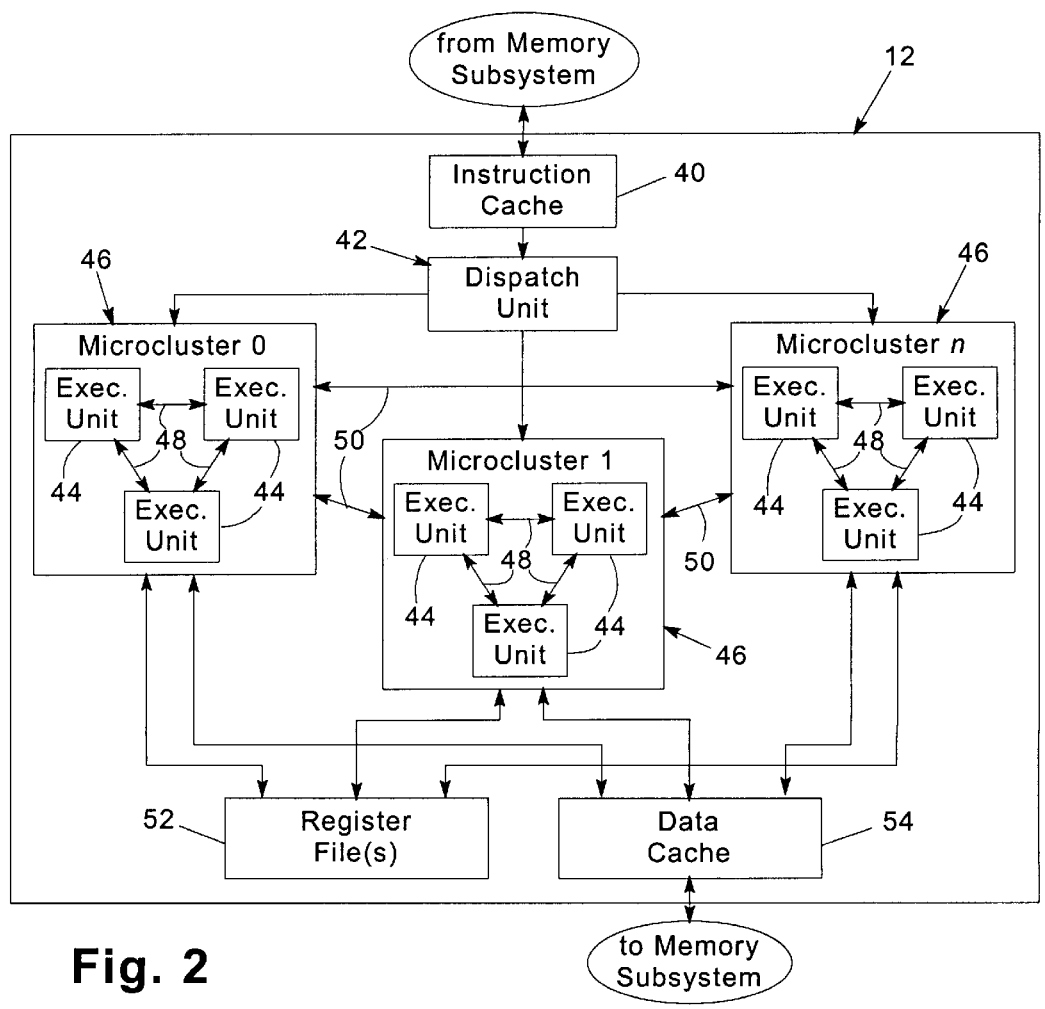
FIG. 2 is a block diagram of a system processor from the data processing system of FIG. 1.

As to a hardware-based implementation, FIG. 2 illustrates the primary instruction fetching, decoding and execution components in system processor 12. Instructions are typically fetched from the memory subsystem (including main storage 14 and caches 16 of FIG. 1), to an instruction cache 40. Instructions are then pulled from instruction cache 40 by a dispatch unit 42, which routes those instructions to various execution units 44 disposed throughout the processor. The execution units are arranged into a plurality of microclusters 0 . . . n 46. Typically, the microclusters define groups of execution units within which result forwarding, represented by arrows 48, may be performed within one clock cycle for the processor. Result forwarding between various microclusters is represented by arrows 50, and it is anticipated that intermicrocluster forwarding will typically incur a penalty of one or more clock cycles.

Also shown in FIG. 2 is a register file 52, as well as an integrated data cache 54 interfaced with the memory subsystem. As is well known in the art, each execution unit manipulates data stored in either register file 52 or data cache 54 in response to instructions executed by the execution unit.

It should be appreciated that the architecture of system processor 12 is but one suitable processor implementation consistent with the invention. Other processor architectures may also be used in the alternative.

Figure 3:
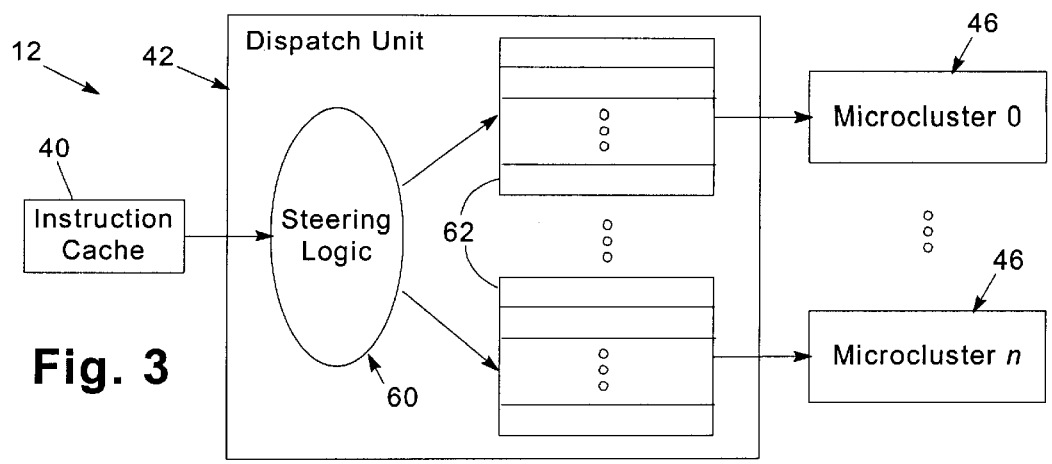
FIG. 3 is a block diagram of the dispatch unit in the system processor of FIG. 2.

FIG. 3 illustrates dispatch unit 42 of system processor 12 in greater detail. The dispatch unit includes a steering logic block 60 that dispatches instructions received from instruction cache 40 to one of a plurality of windows 62, each of which supplies instructions to a particular microcluster 46 associated therewith. Each window 62 may be implemented using any of a number of storage components, e.g., with one or more queues, buffers, instruction registers, and/or reservation stations, among others. Steering logic block 60 essentially receives instructions from the instruction cache and determines to which microclusters each instruction should be dispatched.

Figure 4:
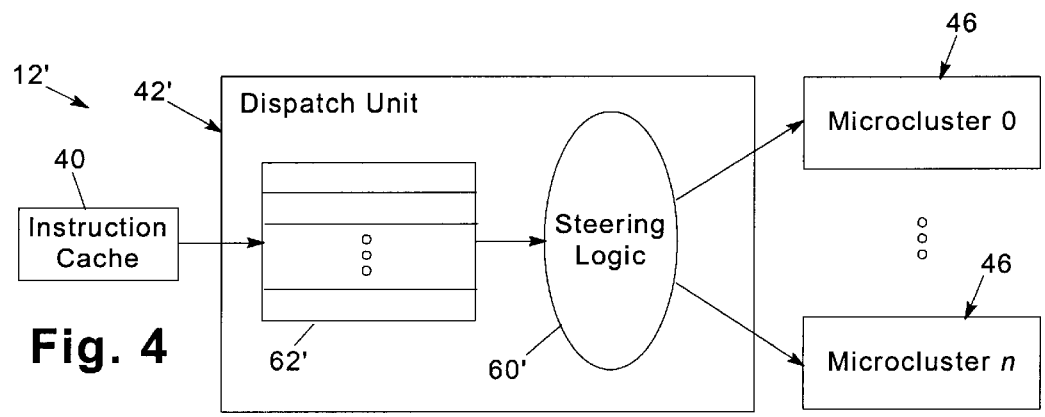
FIG. 4 is a block diagram of an alternate dispatch unit to that of FIG. 3.

Other implementations of dispatch unit 42 may be used in the alternative. For example, as illustrated in FIG. 4, a system processor 12' includes an alternate dispatch unit 42' including a shared window 62' feeding an alternate steering logic block 60' that dispatches instructions to one of a plurality of microclusters 46. In this alternate implementation, a window 62' feeds the steering logic block 60' rather than the opposite situation as illustrated in FIG. 3. Other implementations may also be used in the alternative, e.g., distributing the functionality of steering logic block 60' into multiple units, among others.

Figure 5:
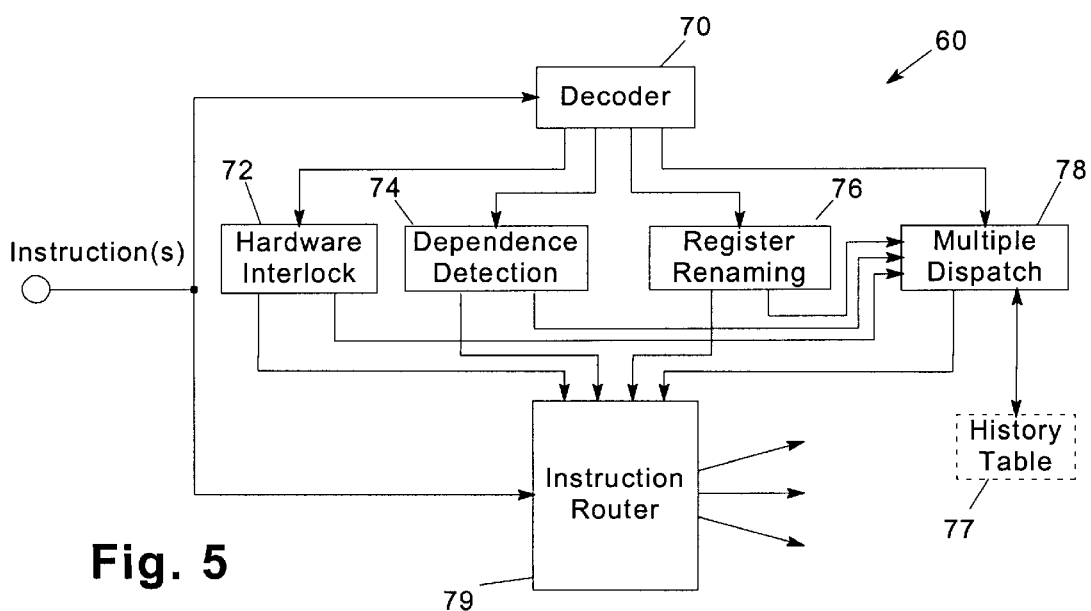
FIG. 5 is a block diagram of the steering logic block in the dispatch unit of FIG. 3.

One suitable implementation of steering logic block 60 is illustrated in greater detail in FIG. 5. As shown in this figure, instructions are fed to a decoder block 70 and are supplied to a plurality of functional blocks 72, 74, 76 and 78 which control the operation of an instruction router 79 that dispatches an instruction to one or more of a plurality of microclusters. Decoder block 70 may operate in a conventional fashion to determine the type of instruction for the purpose of routing an instruction to a particular functional unit, e.g., a fixed point or floating point unit.

Block 72 is a hardware interlock block used to prevent collisions with various execution units by identifying idle execution units, as well as preventing the dispatch of instructions to stalled execution units. Block 74 is a dependence detection block that looks ahead one or more instructions in the instruction stream to determine whether any succeeding instructions are consumers of a particular producer instruction. Block 76 is a register renaming block that translates logical register designators into physical register designators. The operations performed by each of blocks 72, 74 and 76 are well recognized in the art, and any suitable conventional design may be used to implement each block.

Block 78 is a multiple dispatch block that is utilized to determine whether a particular instruction is suitable for replication and dispatch into multiple execution units, in a manner discussed in greater detail below. As shown in FIG. 5, in addition to receiving instruction data from decoder block 70, block 78 may also receive input from one or more of blocks 72, 74 and 76 for use in making the decision as to whether a particular instruction should be replicated and dispatched to multiple execution units.

It should be appreciated that additional logic may be included in the steering logic block to implement additional functionality, e.g., wake-up logic used to wake-up instructions waiting for results to become available, selection logic used to select instructions for execution from a pool of ready instructions, and/or bypass logic used to bypass operand values from instructions that have completed execution, but have not yet written their results to the register file, to subsequent instructions, among others. Moreover, in other implementations, blocks 72–76 may not all be required.

Figure 6:
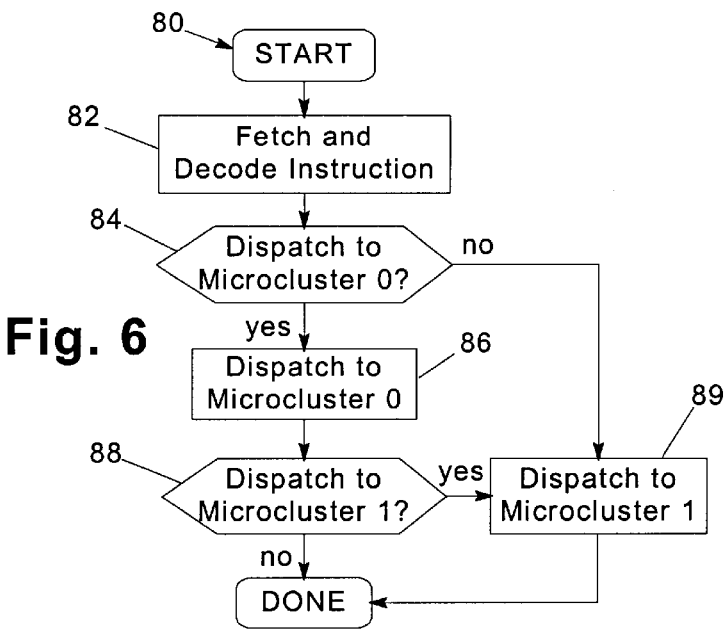
FIG. 6 is a flowchart illustrating the decision logic implemented in the steering logic block of FIG. 5 in a two microcluster processor implementation.

FIG. 6 illustrates the flowchart of the program flow in the decision logic in steering logic block 60 in a two-microcluster implementation. As shown in this figure, program flow begins in block 82 by fetching and decoding an instruction. Next, in block 84, a determination is made whether the instruction should be dispatched to microcluster 0. If so, control passes to block 86 to dispatch the instruction to microcluster 0. Next, a determination is made in block 88 as to whether the instruction should also be dispatched to microcluster 1. If not, no further processing of the instruction is required. If, however, the instruction should also be dispatched to microcluster 1, control passes to block 89 to dispatch the instruction to the additional microcluster. Moreover, returning to block 84, if it is determined that the instruction should not be dispatched to microcluster 0, control passes to block 89 to ensure that the instruction is dispatched to the other available microcluster.

It should be appreciated that the program flow shown in FIG. 6 may be implemented using parallel circuitry such that the determination and dispatch of the instruction to multiple microclusters may occur concurrently. Moreover, it should be appreciated that when additional microclusters are utilized, the decision logic may be configured to output to more than two clusters, e.g., by selecting subsets of microclusters, or by providing individual yes/no outputs directed to each microcluster. Other alternatives will be apparent to one of ordinary skill in the art.

Figure 7:
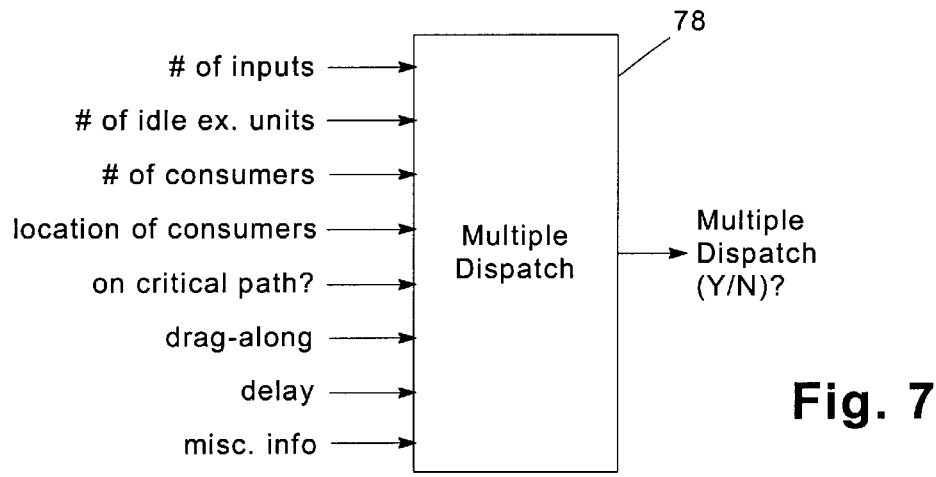
FIG. 7 is a block diagram of the multiple dispatch logic block in the steering logic block of FIG. 5.

FIG. 7 illustrates one suitable implementation of multiple dispatch block 78, functioning essentially as a "black box" that decides whether a particular instruction should be dispatched to multiple execution units. The black box takes a number of inputs, not necessarily limited to the ones enumerated in the figure, and uses a priority function that combines these inputs to make the decision. Some of the possible inputs to the black box include:

Number of Inputs. The number of input or source register operands for the instructions. In general, fewer inputs make an instruction a better candidate for multiple dispatch, since fewer register values will have to be communicated to the multiple instances of the instruction.

Number of Idle Execution Units. The number of idle execution units can be used to limit the degree of multiple dispatch. That is, if only a single execution unit is idle, the instructions should be dispatched once, not multiple times. Dispatching a second instance of an instruction to an execution unit that is already busy will most likely not increase performance.

Number of Consumers. If the instruction only has a single consumer, dispatching to multiple execution units will probably not increase performance. However, if there are multiple consumers, the consumers can be distributed among the multiple execution units, resulting in a performance increase.

Location of Consumers. If the consumers have already been assigned to a particular execution unit or execution units, the instructions should also be dispatched into those execution units to avoid transmitting the results from a different execution unit. Furthermore, if different consumers have been assigned to execution units located in different microclusters, the penalty for result forwarding is greater than if all consumers are assigned to execution units in the same microcluster.

On Critical Path?. If the instruction is not on a critical path, its transmission latency can be overlapped with other work that is on the critical path. Hence, eliminating the transmission latency via multiple dispatch would not likely increase performance.

Figure 8:
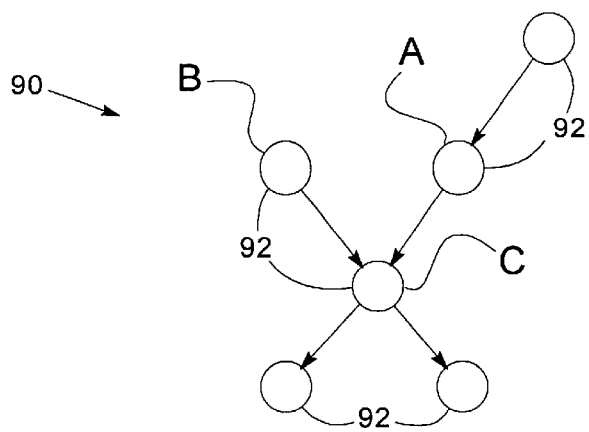
FIG. 8 is a instruction dependency diagram for a portion of an exemplary computer program illustrating a drag along effect handled by the multiple dispatch block of FIG. 6.

Drag-Along. If the instruction's inputs are produced by more than one earlier instruction, dispatching it to multiple execution units may have a dragalong effect of also dispatching those earlier instructions to multiple execution units. A risk exists that dispatching the instruction to multiple execution units may overwhelm the units. For example, as illustrated by the instruction dependency diagram 90 of FIG. 8 (including instructions represented at 92), replication of an instruction C would likely necessitate replication also of instructions A and B, since C is dependent upon the results of each of these instructions. In this event, replicating instruction C could excessively burden the processor due to the additional redundant instructions resulting therefrom.

Delay. This is the result transmission delay between execution units. If the delay is relatively large compared to the execution latency of an instruction, more benefit can be derived from multiple dispatch, hence the black box should favor that decision. Furthermore, if execution units are grouped into microclusters, the delay between execution units in different pairs of microclusters may differ from one another, as well as the delay between execution units in the same microcluster.

Additional Information. Other information could be used to help the black box make the decision. This could be historical information, similar to that collected by a branch history table, that indicates whether or not an earlier decision about whether or not to dispatch this instruction to multiple execution units had negative or positive results.

The black box may be designed, for example, via an iterative process of specification, implementation and analysis. This is usually done via trace-driven simulation, where an instruction trace of a representative work load is collected, and then a software simulator is constructed that models the particular design point for the black box. The trace is then processed through the simulator, and certain statistical metrics are collected. As an example, these might include the number of inter-execution unit or inter-microcluster result transmissions, or the number of delay cycles caused by these transmissions. The design point would then be modified slightly, and the trace processed again. The results would then be compared to the results for the initial design point, and further changes to the design would be made based upon this analysis. This iterative process would repeat itself over and over, until the black box design evolved to the point where the designer was satisfied with its performance. Other factors, such as implementation complexity, hardware costs, cycle time effects, power consumption, and other factors may also be considered when picking a design point that performs reasonably well without adversely impacting any of the other factors. Such an iterative design process is routinely used to design other features of processors, such as instruction and data caches, branch predictors, instruction pipelines, etc. Of course, other manners of designing and developing a multiple dispatch decision logic may be utilized in the alternative.

It should be appreciated that additional modifications to the design of processor 12 may be utilized in the alternative. Thus, the invention should not be limited to the particular implementations disclosed herein.

Figure 9:
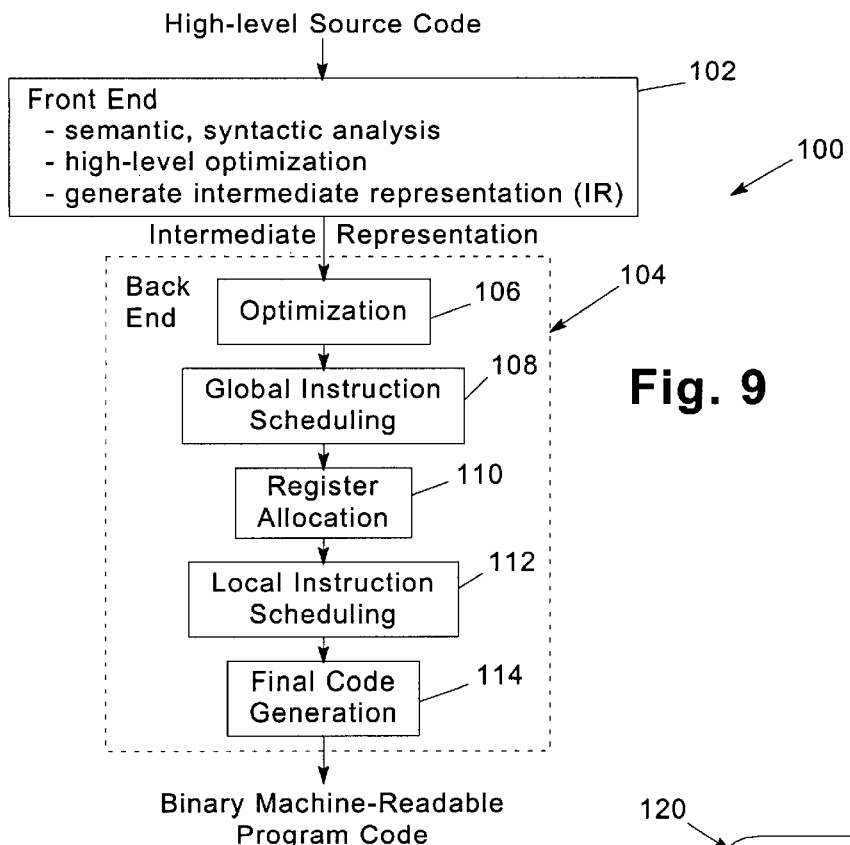
FIG. 9 is a block diagram of a compiler computer program consistent with the invention.

As discussed above, the decision as to whether to replicate a producer instruction to execute concurrently on multiple execution units may also be made during compilation of a computer program. For example, as illustrated in FIG. 9, a compiler 100, which may be wholly or partly resident in any of the components discussed above with respect to compiler 32 of FIG. 1, includes a front end 102 and a back end 104. Front end 102 handles conventional operations such as semantic and syntactic analysis and high-level optimization. In addition, the front end 102 generates an intermediate representation (IR) from the high-level source code of the computer program being compiled.

The back end 104 of compiler 100 performs a number of conventional optimizations, as illustrated at block 106. In addition, global instruction scheduling is performed at block 108, followed by register allocation at block I 10, local instruction scheduling at 112 and final code generation at 114, from which a binary machinereadable program code is output.

It is anticipated that multiple dispatch of instructions may be handled at one or both of the global instruction scheduling and local instruction scheduling blocks 108, 112. Instruction scheduling in general is a well recognized compiler operation. However, conventional scheduling functionality may be supplemented with multiple dispatch logic to selectively dispatch multiple copies of an instruction in a manner consistent with the invention.

Figure 10:
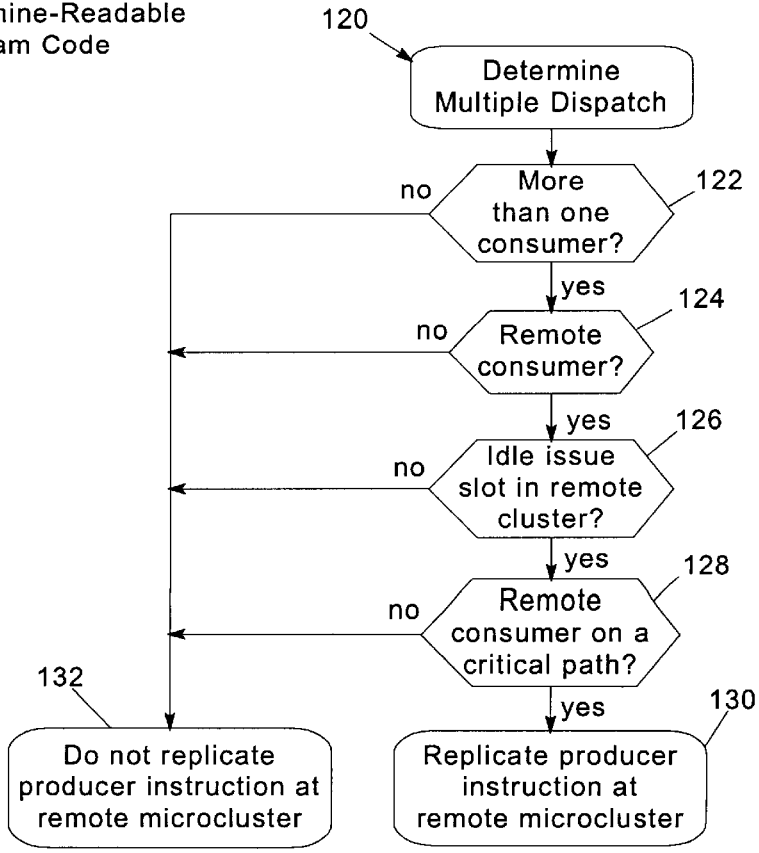
FIG. 10 is a flowchart illustrating the program flow of the compiler computer program of FIG. 9.

As shown in FIG. 10, for example, a determine multiple dispatch routine 120 may be executed during one or both of blocks 108, 112 of FIG. 9 to determine whether a particular instruction should be dispatched to multiple microclusters. In this implementation, it is assumed that a performance penalty occurs for result forwarding between execution units in different microclusters, but that no such penalty occurs for result forwarding between execution units within the same microcluster. It is also assumed that two microclusters between which it is possible to forward results are present in the target processor for the computer program.

To this extent, routine 120 performs a series of decisions in blocks 122, 124, 126 and 128 before determining whether or not to replicate a producer instruction at a particular microcluster. Block 122 determines whether more than one consumer instruction exists for the instruction being processed. Block 124 next determines whether the consumer, if any, is remote to the producer instruction—that is, whether the consumer is in a different microcluster. Block 126 then determines whether an idle issue slot exists in an execution unit in the remote microcluster, and block 128 determines whether the consumer is on a critical path.

If all of these decisions result in affirmative responses, routine 120 replicates the producer instruction at the remote microcluster in block 130. However, if any of the decision blocks results in a negative result, control instead passes to block 132 to not replicate the producer instruction at the remote microcluster. In either event, routine 120 is then complete.

Assigning a particular instruction to a particular microcluster may be performed at the compiler level in a number of different manners based upon the type of processor and/or the type of instruction set. For example, for a very long instruction word (VLIW) processor, the compiler can directly assign instructions to specific execution units. On the other hand, for a superscalar (RISC) processor, the compiler can attempt to predict via simulation where particular instructions will end up based upon a knowledge of the dispatch logic for the target processor.

Implementation of multiple dispatch in the compiler conceptually operates in much the same manner as rematerialization which is conventionally used by compilers when faced with a shortage of register storage locations. In particular, rematerialization discards a value and recomputes the value at a point where it is needed again, rather than spilling and reloading the register value by communicating it via memory from one section of a program to another. An advantage of a compiler implementation of multiple dispatch over a run time implementation is that a larger scope of instructions may be analyzed to obtain a better set from which decisions may be made. In particular, the number and locations of consumers may then be determined of greater extent than would be available during the run time.

Various modifications may be made to the illustrated embodiments without departing from the spirit and scope of the invention. For example, as mentioned above, history data may be used in deciding whether to replicate a particular instruction, whether via a runtime or compiler implementation. In a runtime implementation, for example, a history table, e.g., as represented by optional history table 77 of FIG. 5, may be hashed by an instruction or by its address, and may store information such as the number and/or locations of past consumers of an instruction, whether replication was beneficial in past iterations, etc. In a compiler implementation, program simulation may be used to simulate the execution of a program and determine therefrom history data for the program suitable for use in routing to and, if necessary, replicating instructions in, various execution units in a target processor.

Other modifications may be made to the illustrated embodiments consistent with the invention. Therefore, the invention lies in the claims hereinafter appended.

What is claimed is:

1. A circuit arrangement, comprising:
   (a) a plurality of execution units, each execution unit configured to execute instructions supplied thereto; and
   (b) a dispatch unit, coupled to the plurality of execution units, the dispatch unit configured to determine whether to dispatch multiple copies of a producer instruction to multiple execution units the dispatch unit further configured to determine whether the producer instruction is likely to have multiple consumer instructions associated therewith.

2. The circuit arrangement of claim 1, wherein the dispatch unit is further configured to dispatch multiple copies of the producer instruction to multiple execution units responsive to determining that multiple copies of the producer instruction should be dispatched.

3. The circuit arrangement of claim 1, wherein the dispatch unit is further configured to determine to which of the plurality of execution units to dispatch the multiple copies of the producer instruction.

4. The circuit arrangement of claim 1, wherein the dispatch unit is further configured to determine whether to dispatch multiple copies of the producer instruction to multiple execution units by analyzing at least one of a number of inputs for the producer instruction, a number of idle execution units, a number of consumer instructions for the producer instruction, a location of at least one of the consumer instructions for the producer instruction, a transmission delay between at least two of the plurality of execution units, whether the producer instruction is on a critical path, and whether the producer instruction has inputs produced by more than one earlier instruction.

5. The circuit arrangement of claim 1, wherein the dispatch unit further comprises a history table, and wherein the dispatch unit is further configured to determine whether to dispatch multiple copies of the producer instruction to multiple execution units by analyzing history data stored in the history table and associated with at least one of the producer and consumer instructions.

6. The circuit arrangement of claim 1, wherein the dispatch unit comprises:
   (a) at least one instruction window configured to store a plurality of instructions for execution by the plurality of execution units; and
   (b) a steering logic circuit arrangement, coupled to the instruction window and configured to route instructions from an instruction stream to at least one of the plurality of execution units.

7. The circuit arrangement of claim 6, wherein the dispatch unit comprises a plurality of instruction windows, each associated with one of the plurality of execution units, and wherein the steering logic circuit arrangement is coupled intermediate an instruction cache storing the instruction stream and the plurality of instruction windows and is configured to route instructions received from the instruction cache to at least one of the plurality of instruction windows for execution by the execution unit associated therewith.

8. The circuit arrangement of claim 6, wherein the instruction window is a shared window associated with all of the plurality of execution units, and wherein the steering logic circuit arrangement is coupled intermediate the instruction window and the plurality of execution units and is configured to route instructions stored in the instruction window to at least one of the plurality of execution units.

9. The circuit arrangement of claim 6, wherein the steering logic circuit arrangement comprises:
   (a) a decoder configured to decode instructions from the instruction stream and output at least one control signal;
   (b) an instruction router configured to route instructions to at least one of the plurality of execution units; and
   (c) a multiple dispatch circuit arrangement configured to control the instruction router responsive to the control signal from the decoder.

10. The circuit arrangement of claim 9, wherein the multiple dispatch circuit arrangement is further responsive to at least one of a hardware interlock circuit arrangement, a dependence detection circuit arrangement and a register renaming circuit arrangement coupled to the decoder.

11. The circuit arrangement of claim 1, wherein the plurality of execution units includes first and second execution units, wherein the multiple consumer instructions includes first and second consumer instructions, and wherein the dispatch unit is configured to respectively dispatch first and second copies of the producer instruction to the first and second execution units, and thereafter to respectively dispatch the first and second consumer instructions to the first and second execution units.

12. The circuit arrangement of claim 11, wherein the first and second execution units are respectively configured to provide a result of execution for the first and second copies of the producer instruction as input parameters for the first and second consumer instructions.

13. The circuit arrangement of claim 11, wherein the first and second execution units are respectively disposed in first and second microclusters.

14. The circuit arrangement of claim 11, wherein the first and second execution units are configured to process the first and second copies of the producer instruction in parallel.

15. An integrated circuit device comprising the circuit arrangement of claim 1.

16. A data processing system comprising the circuit arrangement of claim 1.

17. A program product, comprising a hardware definition program that defines the circuit arrangement of claim 1; and a signal bearing media bearing the hardware definition program.

18. The program product of claim 17, wherein the signal bearing media includes at least one of a transmission type media and a recordable media.

19. A data processing system, comprising:
   (a) a memory within which is stored a computer program comprising a plurality of instructions; and
   (b) a processor, coupled to the memory, the processor including:

(i) a plurality of execution units, each execution unit configured to execute instructions supplied thereto; and (ii) a dispatch unit, coupled to the plurality of execution units, the dispatch unit configured to determine whether to dispatch multiple copies of a producer instruction from the computer program to multiple execution units in the processor, the dispatch unit configured to determine whether the producer instruction is likely to have multiple consumer instructions associated therewith.

20. A method of dispatching instructions for execution on a processor having a plurality of execution units, the method comprising:

(a) determining whether to dispatch multiple copies of a producer instruction to multiple execution units in the processor, including determining whether the producer instruction is likely to have multiple consumer instructions associated therewith; and (b) if so, dispatching multiple copies of the producer instruction to multiple execution units in the processor.

21. The method of claim 20, wherein determining whether to dispatch multiple copies of the producer instruction is performed during runtime.

22. The method of claim 20, wherein determining whether to dispatch multiple copies of the producer instruction is performed during compilation of a computer program incorporating the producer instruction.

23. The method of claim 20, further comprising determining to which of the plurality of execution units to dispatch the multiple copies of the producer instruction.

24. The method of claim 20, wherein determining whether to dispatch multiple copies of the producer instruction includes analyzing at least one of a number of inputs for the producer instruction, a number of idle execution units, a number of consumer instructions for the producer instruction, a location of at least one of the consumer instruction for the producer instruction, a transmission delay between at least two of the plurality of execution units, whether the producer instruction is on a critical path, and whether the producer instruction has inputs produced by more than one earlier instruction.

25. The method of claim 20, wherein determining whether to dispatch multiple copies of the producer instruction includes analyzing history data associated with the producer instruction.

26. The method of claim 20, further comprising processing the multiple copies of the producer instruction in parallel.

27. A method of compiling a computer program for execution on a computer having a plurality of execution units, the method comprising:

(a) determining whether a producer instruction in the computer program is likely to have multiple consumer instructions in the computer program associated therewith; and (b) responsive to determining that the producer instruction is likely to have multiple consumer instructions associated therewith, adding a redundant copy of the producer instruction to the computer program such that multiple copies of the producer instruction will be concurrently executed by multiple execution units in the computer.

28. The method of claim 27, wherein adding the redundant copy of the producer instruction is further responsive to determining that the time to communicate a result of the producer instruction to one of the consumer instructions will be greater than the time to recompute the result of the producer instruction in the same execution unit that will handle execution of the one consumer instruction.

29. The method of claim 27, further comprising determining to which of the plurality of execution units to dispatch the multiple copies of the producer instruction.

30. The method of claim 27, wherein determining whether the producer instruction is likely to have multiple consumer instructions includes analyzing at least one of a number of inputs for the producer instruction, a number of idle execution units, a number of consumer instructions for the producer instruction, a location of at least one of the consumer instruction for the producer instruction, a transmission delay between at least two of the plurality of execution units, whether the producer instruction is on a critical path, and whether the producer instruction has inputs produced by more than one earlier instruction.

31. The method of claim 27, wherein determining whether the producer instruction is likely to have multiple consumer instructions includes analyzing history data associated with the producer instruction.

32. A circuit arrangement, comprising:

(a) a plurality of execution units, each execution unit configured to execute instructions supplied thereto; and (b) a dispatch unit, coupled to the plurality of execution units, the dispatch unit configured to determine whether to dispatch multiple copies of a producer instruction to multiple execution units by analyzing at least one of a number of inputs for the producer instruction, a number of idle execution units, a number of consumer instructions for the producer instruction, a location of at least one of the consumer instructions for the producer instruction, a transmission delay between at least two of the plurality of execution units, whether the producer instruction is on a critical path, and whether the producer instruction has inputs produced by more than one earlier instruction.

33. A method of dispatching instructions for execution on a processor having a plurality of execution units, the method comprising:

(a) determining whether to dispatch multiple copies of a producer instruction to multiple execution units in the processor, including analyzing at least one of a number of inputs for the producer instruction, a number of idle execution units, a number of consumer instructions for the producer instruction, a location of at least one of the consumer instruction for the producer instruction, a transmission delay between at least two of the plurality of execution units, whether the producer instruction is on a critical path, and whether the producer instruction has inputs produced by more than one earlier instruction; and (b) if so, dispatching multiple copies of the producer instruction to multiple execution units in the processor.

* * * * *